United States Patent [19]
Davis et al.

(10) Patent No.: US 10,371,012 B2
(45) Date of Patent: Aug. 6, 2019

(54) MOBILE POWER GENERATION SYSTEM INCLUDING FIXTURE ASSEMBLY

(71) Applicant: On-Power, Inc., Lebanon, OH (US)

(72) Inventors: Larry D. Davis, Lebanon, OH (US); Mark Meineke, Lebanon, OH (US)

(73) Assignee: ON-POWER, INC., Lebanon, OH (US)

( * ) Notice: Subject to any disclaimer, the term of this patent is extended or adjusted under 35 U.S.C. 154(b) by 59 days.

(21) Appl. No.: 15/689,433

(22) Filed: Aug. 29, 2017

(65) Prior Publication Data

US 2019/0063262 A1 Feb. 28, 2019

(51) Int. Cl.

| | |
|---|---|
| *F01D 15/10* | (2006.01) |
| *F02C 6/00* | (2006.01) |
| *F01D 25/28* | (2006.01) |
| *F02B 63/04* | (2006.01) |
| *H02K 7/18* | (2006.01) |
| *E21B 43/12* | (2006.01) |
| *F02B 63/06* | (2006.01) |

(52) U.S. Cl.
CPC ............. *F01D 25/28* (2013.01); *F01D 15/10* (2013.01); *F02B 63/047* (2013.01); *H02K 7/1823* (2013.01); *E21B 43/126* (2013.01); *F02B 63/06* (2013.01); *F02B 2063/045* (2013.01)

(58) Field of Classification Search
CPC ............................. F01D 25/28; F02B 2063/045
See application file for complete search history.

(56) References Cited

U.S. PATENT DOCUMENTS

| | | | |
|---|---|---|---|
| 3,791,682 A | 2/1974 | Mitchell | |
| 4,317,556 A * | 3/1982 | Dietrich, III | ............. F16M 5/00 248/602 |
| 5,517,822 A * | 5/1996 | Haws | .................... F01K 17/025 122/1 R |
| 6,765,304 B2 | 7/2004 | Baten et al. | |
| 6,786,051 B2 * | 9/2004 | Kristich | .................. F01D 15/10 60/796 |

(Continued)

FOREIGN PATENT DOCUMENTS

WO WO2005086862 A2 9/2005

OTHER PUBLICATIONS

International Search Report and Written Opinion relating to International Application No. PCT/US2017/049060 dated May 24, 2018.

*Primary Examiner* — Tulsidas C Patel
*Assistant Examiner* — Thomas K Quigley
(74) *Attorney, Agent, or Firm* — Dinsmore & Shohl LLP

(57) ABSTRACT

Mobile power generation system and methods using a fixture to position a generator pad assembly in a mobile power generation system include providing a trailer including a rear end, a front end, a bottom end, and a top end, a gas turbine housed inside the trailer having an internal base, and an electrical generator coupled to the gas turbine to generate electricity and housed inside the trailer. The generator pad assembly may include a plurality of generator pads fixed to the internal base, a respective plurality of sole plates positioned above the plurality of generator pads at a spacing, and a supportive material positioned around the plurality of generator pads and the respective plurality of sole plates to fix them in an aligned position. The fixture may be configured to fix the generator pad assembly to the internal base at the aligned position.

19 Claims, 17 Drawing Sheets

(56) References Cited

U.S. PATENT DOCUMENTS

| | | | |
|---|---|---|---|
| 7,036,318 B1 * | 5/2006 | Munson, Jr. | F01D 15/10 60/39.281 |
| 7,267,319 B2 * | 9/2007 | Vitrone | F01D 25/28 248/649 |
| 8,587,136 B2 * | 11/2013 | Williams | F01K 13/00 290/1 A |
| 8,872,366 B2 | 10/2014 | Campion et al. | |
| 9,103,193 B2 | 8/2015 | Coli et al. | |
| 9,121,257 B2 | 9/2015 | Coli et al. | |
| 9,140,110 B2 | 9/2015 | Coli et al. | |
| 2009/0015021 A1 | 1/2009 | Towada | |
| 2013/0106114 A1 | 5/2013 | Wang et al. | |
| 2015/0184591 A1 | 7/2015 | Giancotti et al. | |
| 2016/0333777 A1 * | 11/2016 | Nandigama | F02B 63/044 |

\* cited by examiner

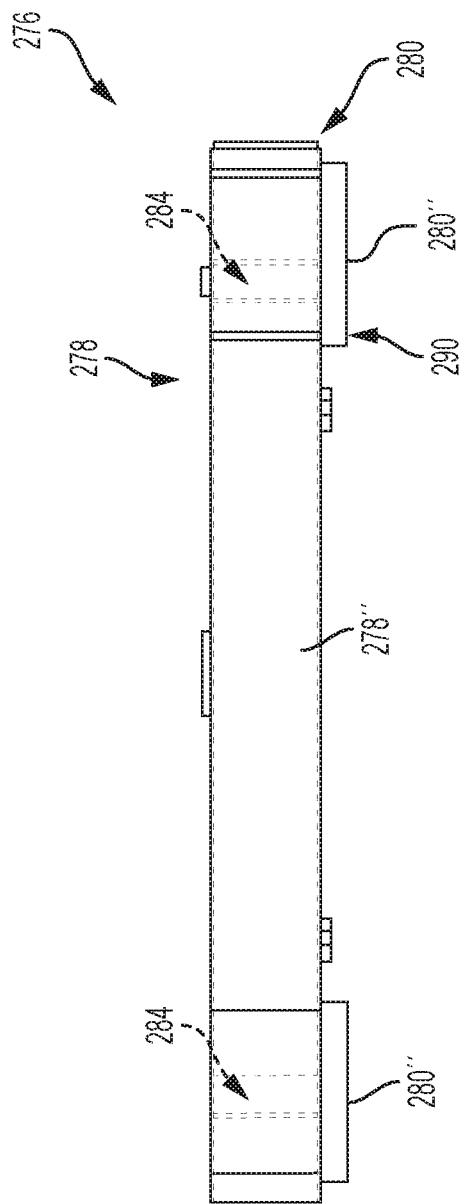

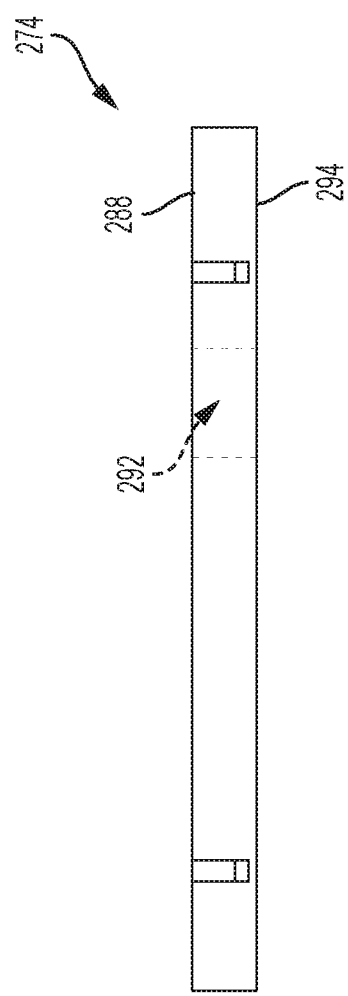

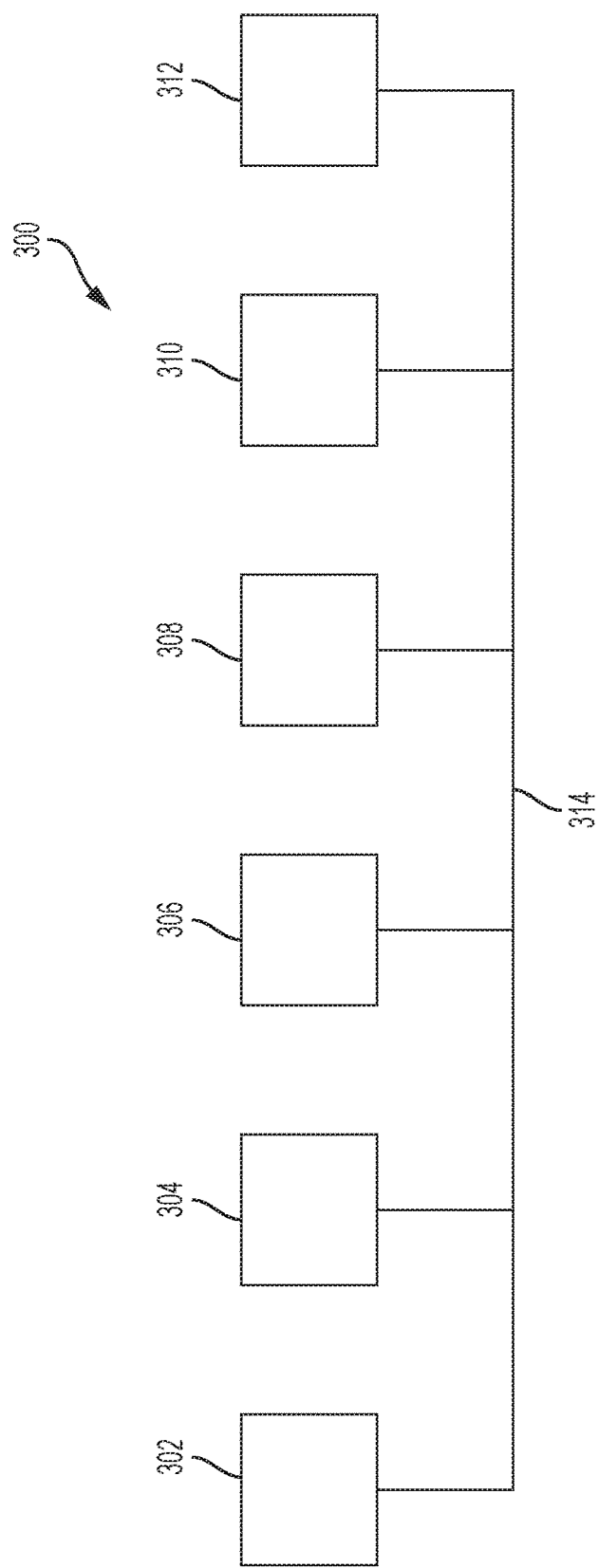

MOBILE POWER GENERATION SYSTEM INCLUDING FIXTURE ASSEMBLY

TECHNICAL FIELD

The present specification generally relates to power generation systems, and more specifically to mobile power generation systems for operations that may use remotely generated power, such as fracking.

BACKGROUND

The present disclosure relates generally to a mobile power generation system, and more particularly to a gas turbine-based mobile power generation system that can provide electrical power through a generator to a plurality of electrically driven motors operating as, for example, fluid pumps in a fracturing operation (also referable to as fracking). Such remotely generated power may be in addition to or an alternative of power from the grid.

In a fracturing operation, a fluid and additive slurry including sand is injected at a wellbore into a rock formation that bears hydrocarbon to allow for fracturing as the sand remains in a created fracture in a flow path in the wellbore while most of the other injected fluids flow back and are recovered from the wellbore. The created fracture with the sand creates a permeable membrane for hydrocarbon fluids and gases (i.e., natural gas) to flow through for recovery and use as, for example, an energy source.

Electrical power may be generated and used to deliver fracturing fluid through fluid pumps to a wellbore at the fracturing operation site. Surface pumping systems including such fluid pumps are utilized to accommodate the various fluids, which pumping systems may be mobilized at wellbores on, for example, skids or tractor-trailers. A dedicated source of power may be a turbine generator coupled to a source of natural gas that drives the turbine generator to produce electrical power. The electrical power may be sent to one or more of the surface pumping systems through coupling cables such as leads to couple to and operate the fluid pumps.

The fracturing operation site often encompasses a large footprint with the number of wellbores and supporting components. The supporting components take time to be transported to the fracturing operation site and to be setup for utilization at the fracturing operation site with the wellbores. A reduction in setup time would assist with increased efficiency in use of such supporting components at the fracturing operation site. Accordingly, there exists a need for an alternative mobile power generation system.

BRIEF SUMMARY

In one embodiment, a mobile power generation system may include a trailer including a rear end, a front end, a bottom end, and a top end defining therebetween an interior space that comprises an internal base, a gas turbine housed inside the trailer in the interior space, an electrical generator coupled to the gas turbine to generate electricity and housed inside the trailer in the interior space, a generator pad assembly including, and a fixture. The generator pad assembly may include a plurality of generator pads fixed to the internal base, a respective plurality of sole plates positioned above the plurality of generator pads at a spacing, and a supportive material positioned around the plurality of generator pads and the respective plurality of sole plates to fix them in an aligned position. The fixture may be configured to fix the generator pad assembly to the internal base at the aligned position.

In embodiments, the supportive material positioned around the plurality of generator pads and the respective plurality of sole plates is disposed between the internal base and at about ¼ inches above a lower-facing surface of each sole plate. The supportive material may include a cured porous resinous material for chocking such as CHOCK-FAST ORANGE. The plurality of generator pads may include four generator pads, and the spacing is disposed along a z-axis at a range of from about ¼ inches to about ½ inches. The fixture may include a plurality of base beams aligned and configured to form a desired alignment shape. The desired alignment shape formed by the plurality of base beams may be a rectangle. The fixture may include a plurality of mounting pads. The plurality of mounting pads may extend from at least two opposing base beams of the plurality of base beams. A first pair of mounting pads may be positioned to extend from near ends of a first base beam, and a second pair of mounting pads may be positioned to extend from near ends of a second base beam placed opposite to and in parallel with the first base beam. The plurality of mounting pads may be configured to be sized and shaped to be seated within and atop the plurality of generator pads when the fixture is used to position the plurality of generator pads to the internal base. The plurality of mounting pads may be configured to be sized and shaped to be seated within and atop the respective plurality of sole plates when the fixture is used to position the respective plurality of sole plate above the plurality of generator pads when disposed on the internal base.

In another embodiment, a method for using a fixture to position a generator pad assembly in a mobile power generation system may include seating a plurality of mounting pads of the fixture atop a plurality of generator pads, disposing the plurality of generator pads on one or more datum reference points on an internal base of the mobile power generation system in a desired alignment position comprising an x-position and y-position with respect to the internal base, removing the fixture from the plurality of generator pads. The method may further include seating the plurality of mounting pads of the fixture atop a respective plurality of sole plates, establishing the respective plurality of sole plates attached to the fixture in a floating z-position with respect to the plurality of generator pads to form the generator pad assembly, pouring a chocking compound around the generator pad assembly, curing the chocking compound for a period of time, and removing the fixture from the generator pad assembly such that the generator pad assembly with the chocking compound after curing is in a set position configured to receive an electrical generator in a seated position.

In embodiments, the period of time for curing may be greater than 12 hours. The one or more datum reference points may be established between the fixture and the internal base such that a center of the fixture aligns with a center of a section of the internal base on which to seat the electrical generator. The center of the section of the internal base may be established by use of a string line for alignment and by use of end weight markers to mark one or more desired alignment points along the string line.

In embodiments, the method further includes welding the plurality of generator pads to the internal base in the desired alignment position before or after removing the fixture. Further, establishing the respective plurality of sole plates attached to the fixture in a floating z-position with respect to the plurality of generator pads may include positioning a bolt between each generator pad and each respective sole plate at the floating z-position. The method may include removing any remaining bolts or studs from the generator pad assembly after the curing.

These and additional features provided by the embodiments described herein will be more fully understood in view of the following detailed description, in conjunction with the drawings.

BRIEF DESCRIPTION OF THE SEVERAL VIEWS OF THE DRAWINGS

The following detailed description of the present disclosure can be best understood when read in conjunction with the following drawings, where like structure is indicated with like reference numerals and in which:

FIG. 8B schematically illustrates a side elevation view of the fixture of FIG. 8A;

FIG. 10B schematically illustrates a side elevation view of the example sole plate of FIG. 10A.

FIG. 14 schematically illustrates a system for implementing a computer and software-based method to operate one or more systems described herein, such as an optical alignment system, according to one or more embodiments of the present disclosure.

DETAILED DESCRIPTION OF THE PREFERRED EMBODIMENTS

Figure 1:
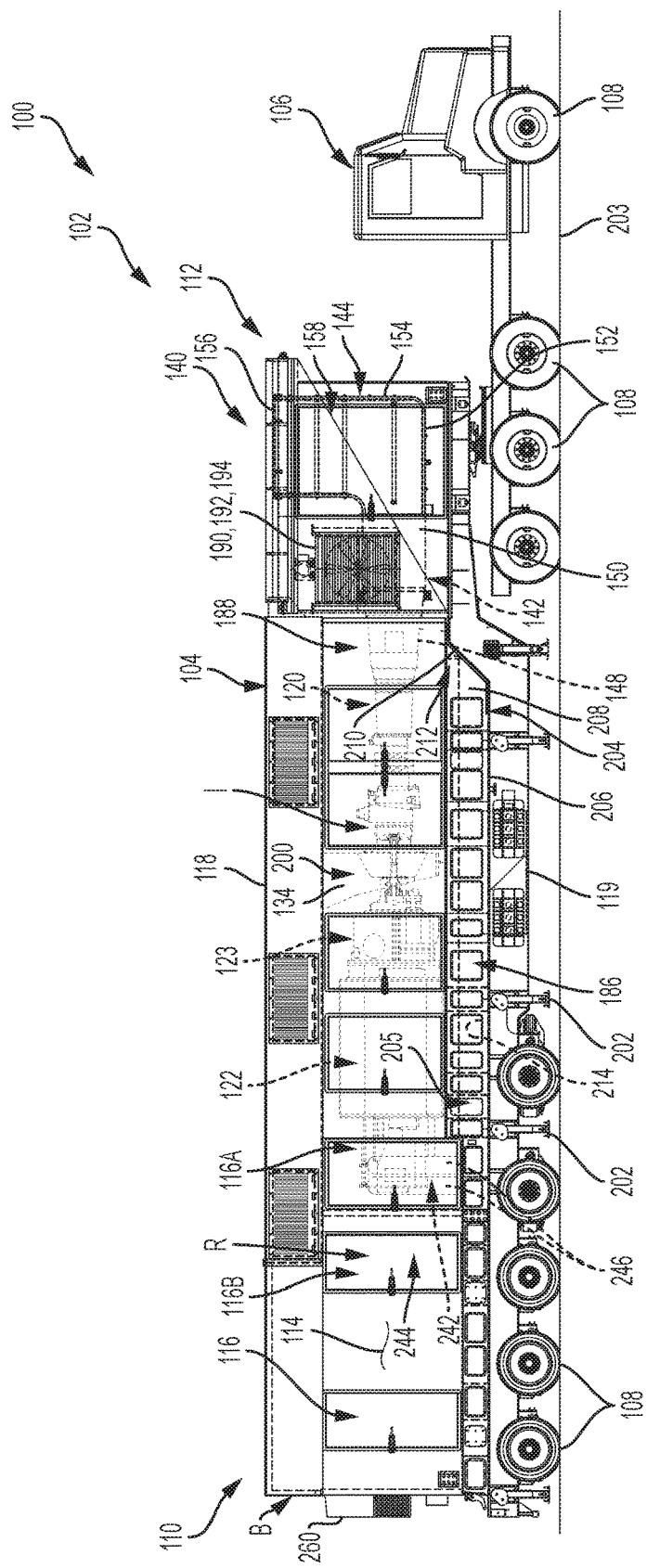
FIG. 1 illustrates a passenger side elevation view of an example mobile power generation system on a mobile unit such as a trailer, which is attached to a tractor, according to one or more embodiments of the present disclosure.

Referring initially to FIG. 1, a mobile power generation system 100 described herein includes a mobile unit 102 that may include a trailer 104 coupled to a tractor 106, each of the trailer 104 and tractor 106 including a plurality of wheels 108. The trailer 104 includes a rear end 110, a front end 112 to which the tractor 106 is configured to be attached, and side panels 114 disposed between the rear end 110 and front end 112. The side panels 114 each comprises one or more access doors 116 configured to access areas of the mobile power generation system 100 housed inside the trailer 104. The trailer 104 further includes a top end 118 and a bottom end 119 respective disposed along top and bottom portions of the side panels 114 and connecting the front end 112 to the rear end 110.

A power control room 244 including, among other components, switchgear, may be positioned at the rear end 110 of the trailer 104 and may be maintained as a regulated portion R at a desired room temperature through an integrated heat, ventilation, and air conditioning (HVAC) system 260, which is described in greater detail below. The rear end 110 of the trailer 104 may further include one or more wall sockets to receive respective coupling cables through which electrical power may be sent to one or more of the surface pumping systems to couple to and operate the fluid pumps.

By way of example and not as a limitation, the trailer 104 houses a gas turbine 120 and an electrical generator 122 coupled to and placed in cooperation with the gas turbine 120. The gas turbine 120 is a combustion engine that may further include a transmission shaft that extends from its main rotational shaft(s) (i.e., coupled to the engine's compressor or turbine) to deliver power to the electrical generator 122. The electrical generator 122 may be placed in cooperation with a drive shaft of the gas turbine 120 so that mechanical power from the gas turbine 120 is converted to electric power for use by one or more electric motors (not shown). Each electric motor may be part of one or more surface pumping systems at a fracturing operation site.

The gas turbine 120 is a combustion engine configured to convert fuels such as natural gas into mechanical energy that drives the electrical generator 122 to produce electrical energy. The gas turbine 120 may be, for example, an aeroderivative ROLLS-ROYCE 501-K series industrial gas turbine as distributed by OnPower, Inc. of Lebanon, Ohio. The gas turbine 120 may include integrated reduction gear including gearing for reduction of a turbine speed to an alternator speed for the electrical generator 122. By way of example and not as a limitation, the turbine speed may be in a range of from about 14,500 RPM to about 14,600 RPM at, respectively, a range of from about 50 Hz to about 60 Hz. Further, the reduced alternator speed may be in a range of from about 1,500 RPM to about 1,800 RPM at, respectively, a range of from about 50 Hz to about 60 Hz. A start system including a starter source as known to those skilled in the art may be used to start the gas turbine 120.

The gas turbine 120 is configured to compress combustion air in a compressor and mix the compressed air with fuel that is burned at high temperatures to combust and to produce a pressurized, heated gas. For example, combustion air as described herein refers to incoming air that is directed toward the gas turbine 120 for combustion. The pressurized, heated gas moves through turbine blades downstream of the compressor in the gas turbine 120 to cause the turbine blades to spin. The pressurized, heated gas may be heated to about 1895 degrees Fahrenheit, for example. The spinning turbine blades turn a drive shaft of the gas turbine 120, which drive shaft is connected to a rotor of the electrical generator 122. The rotor is configured to turn a magnetic device that is surrounded by wire coils in the electrical generator 122 to cause creation of a magnetic field that leads to movement of electrical charge through the wire in the production of electricity. The electrical generator 122 described herein is coupled to the gas turbine 120 to generate electricity, and both the electrical generator 122 and the gas turbine 120 are housed inside the trailer 104 in an interior space I defined by and within the rear end 110, the front end 112, the top end 118, the bottom end 119, and the pair of side panels 114 of the trailer 104. For example, the electrical generator 122 is coupled to the gas turbine 120 through reduction gearing 123, which all having rotating elements that interact together to product electricity.

Figure 2:
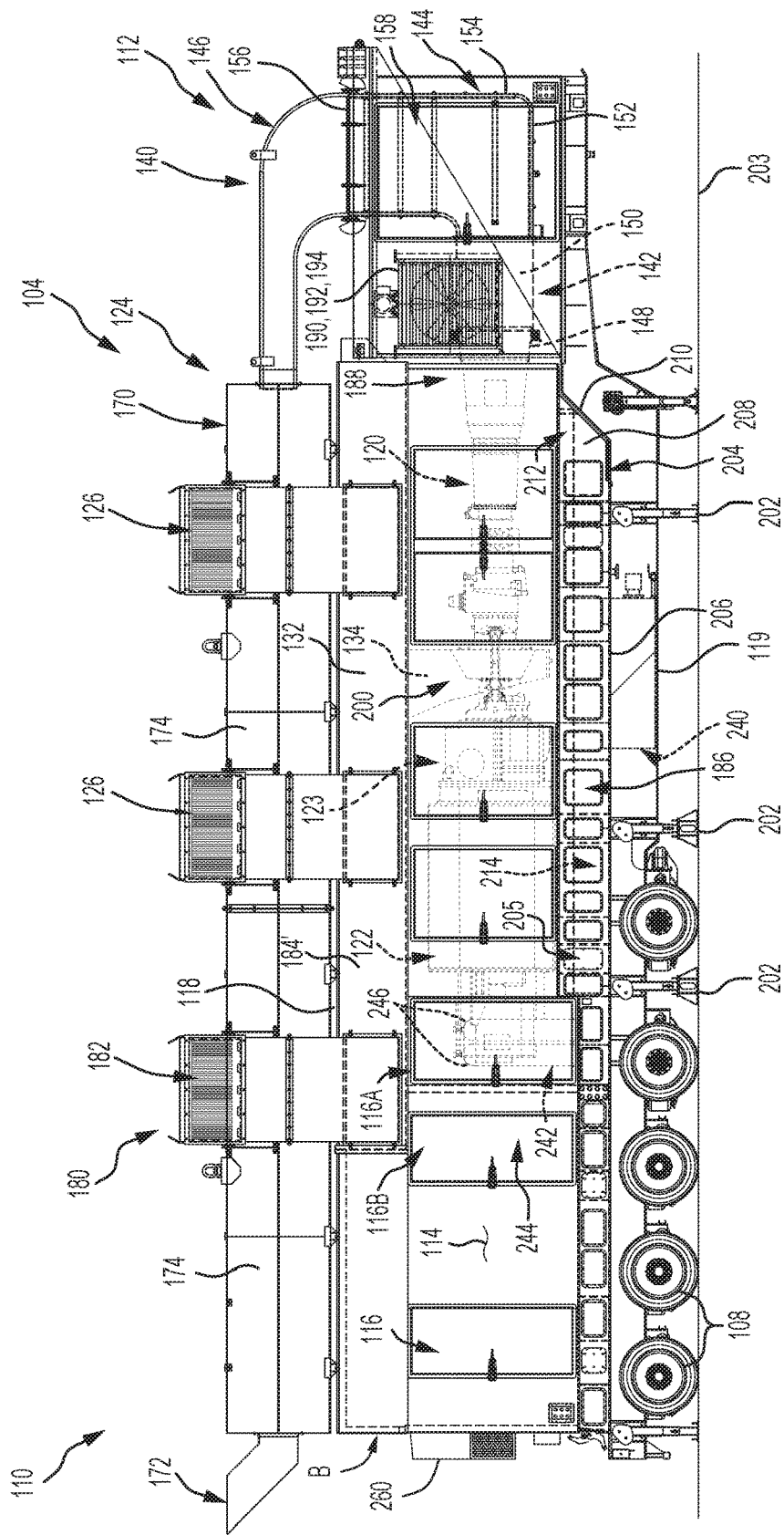
FIG. 2 illustrates another passenger side elevation view of the mobile unit of FIG. 1 in addition to a noise attenuation assembly, according to one or more embodiments of the present disclosure.
Figure 3:
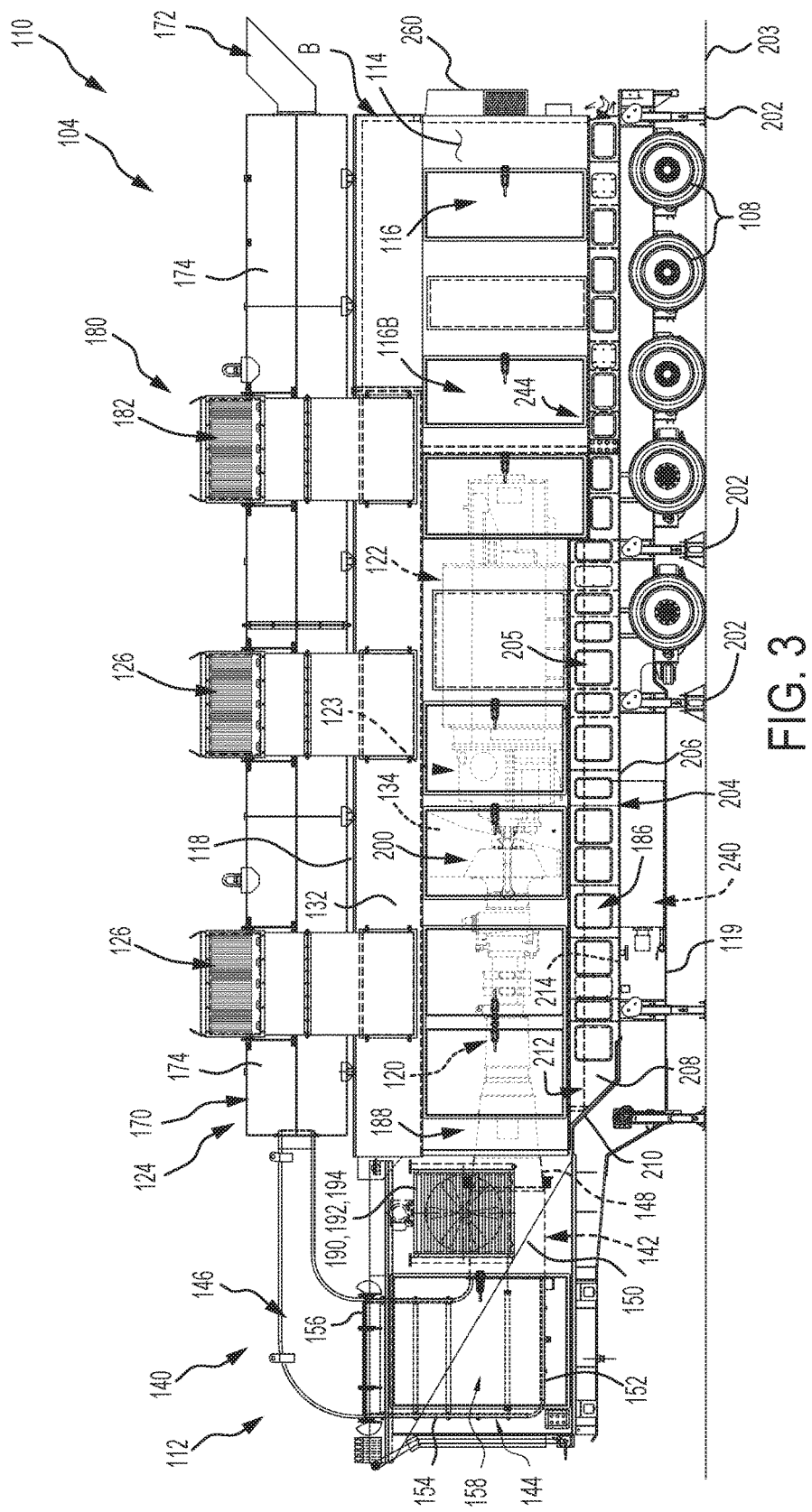
FIG. 3 illustrates a driver side elevation view of the mobile unit of FIG. 2.

Referring to FIGS. 2-3, a noise attenuation assembly 124 is configured to be attached to the top end 118 of the trailer 104. The noise attenuation assembly 124 is attached to and in fluid communication with to an exhaust silencer system 140, described in greater detail further below, which exhaust silencer system 140 is attached to the front end 112 of the trailer 104 of the mobile unit 102.

The noise attenuation assembly 124 further comprises a plurality of silencer hoods respectively comprising at top ends one or more combustion air inlets 126 or one or more ventilation air inlets 182, which are described in greater detail further below. The plurality of silencer hoods are disposed along outer edges of and extend upwardly with respect to side walls of an exhaust silencer unit 170 of the noise attenuation assembly 124, described in greater detail further below, and are further configured to attenuate noise as described herein. A plurality of combustion air inlets 126 and a pair of ventilation air inlets 182 at tops of the silencer hoods, as shown in FIG. 2, attach to and are in fluid communication with respective, corresponding combustion air inlets and ventilation air inlets disposed below the top end 118 and on side panels 114 of the trailer 104, as shown in FIG. 1. As described in greater detail below, ventilation air as described herein refers to incoming air that is drawn in by the ventilation air inlets 182 and used for ventilation and cooling of at least the electrical generator 122. Thus, each air inlet 126, 182 at each top end of each silencer hood is in fluid communication with a corresponding air inlet disposed on an upper portion of a side panel 114 of the trailer 104. As a non-limiting example, one or more vane depositors, such as a 2 and half pass (i.e., turn) vane depositor, configured to extract water from air may be positioned between each inlet 126, 182 and a respective corresponding air inlet disposed on the upper portion of a side panel 114 of the trailer 104.

Figure 4:
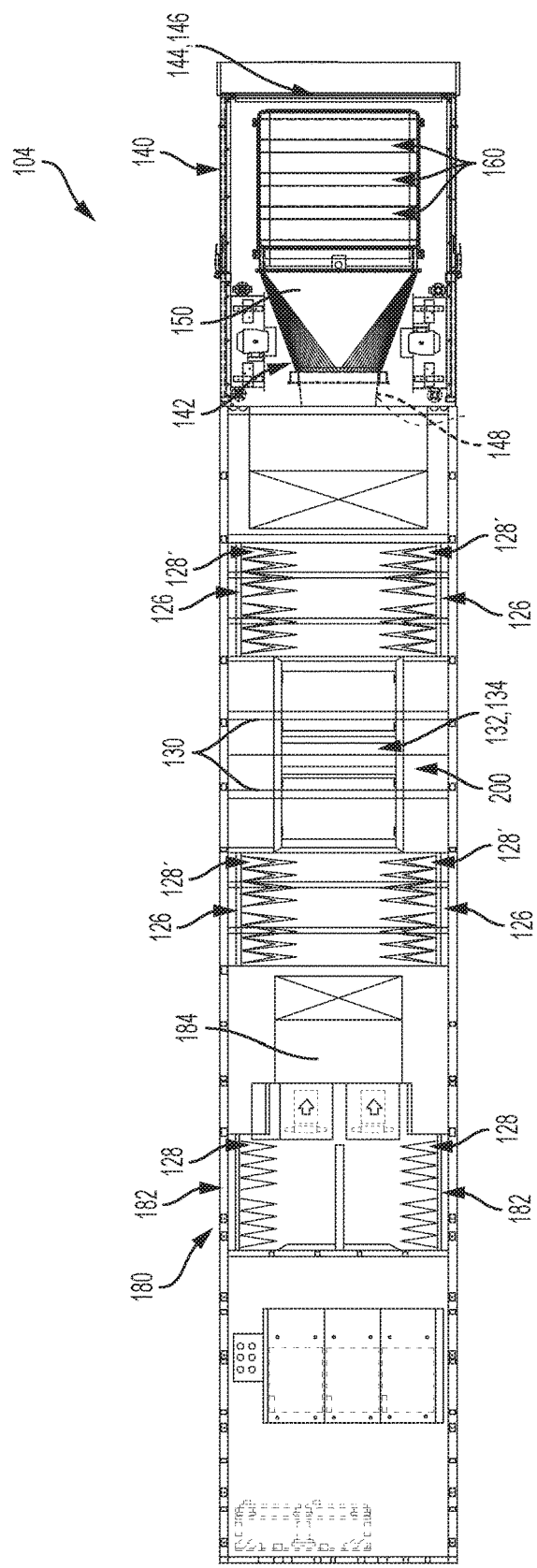
FIG. 4 illustrates a top plan cross-sectional view of the mobile unit of FIG. 2.

By way of example and not as a limitation, the gas turbine 120 receives combustion air from a pair of combustion air inlets 126 mounted along top, side portions of the trailer 104 of the mobile unit 102. Each combustion air inlet 126 may include an opening sized and shaped to hold an air filter 128. In embodiments, as illustrated in FIG. 4, a pair of air filters 128' may be doubled up such that one air filter 128 is stacked within another air filter 128. The pair of air filters 128' may be received in the opening of a respective combustion air inlet 126, which may be a 2 foot by 2 foot opening, for enhanced silencing and filtration. A plurality of baffles 130 may be positioned between the combustion air inlets 126 to assist with absorption of noise energy and may be, for example, about 2 inches to about 8 inches thick each.

Combustion air from each combustion air inlet 126 may be drawn toward a central meeting point in a plenum 132 in cooperation with the combustion air inlets 126 and down through a duct 134 disposed between the plenum 132 and the gas turbine 120 for receipt in the gas turbine 120. The duct 134 may be a bell-mouth inlet duct configured to be a convergent inlet air duct to direct combustion air into an inlet of the gas turbine 120. The bell-mouth inlet duct area may get smaller as combustion air flows into the gas turbine 120. As a non-limiting example, about 28,000 CFM of combustion air may be received by the gas turbine 120.

Referring to FIGS. 2-6, the mobile power generation system 100 includes the exhaust silencer system 140 disposed at the front end 112 of the trailer 104 of the mobile unit 102. The exhaust silencer system 140 includes a diffuser system 142 coupled to a lower exhaust elbow silencer 144 that is coupled to and in fluid communication with an upper exhaust elbow 146. The upper exhaust elbow 146 is configured to be coupled to and in fluid communication with the noise attenuation assembly 124 such that gas exiting from the exhaust silencer system 140 is received through at least an inlet of the noise attenuation assembly 124 and flows in a direction from the front end 112 to the rear end 110 of the trailer 104, as described in greater detail further below.

Exhaust gas from a downstream end of the gas turbine 120 flows through a diffuser 148 of the diffuser system 142. The diffuser 148 is configured to reduce the speed and decrease the pressure of the exhaust gas while directing the exhaust gas into a collector 150 of the diffuser system 142. The diffuser 148 is coupled to the gas turbine 120, and the collector 150 is coupled to and in fluid communication with the lower exhaust elbow silencer 144 of the exhaust silencer system 140. As a non-limiting example, a diameter of the diffuser 148 is increased from 20 inches to about 30 inches to decrease pressure.

The lower exhaust elbow silencer 144 is attached to the diffuser 148 and the collector 150. The exhaust gas flows from the collector 150 into a bottom end 152 of the lower exhaust elbow silencer 144 of the exhaust silencer system 140 and then turns at an upward angle from the bottom end 152 into a side portion 154 of the lower exhaust elbow silencer 144 of the exhaust silencer system 140. The lower exhaust elbow silencer 144 includes the bottom end 152 configured to receive gas from the diffuser system 142, and the side portion 154 angled upwardly with respect to the bottom end 152. The exhaust gas flows through the side portion 154 to a top end 156 of the lower exhaust elbow silencer 144. The top end 156 defines an outlet, the outlet including a plurality of spacings defined by and between a plurality of baffles 160 configured to attenuate noise and described below. At the top end 156, the exhaust gas flows into the upper exhaust elbow 146 and turns again at a sideways angle to flow through into the noise attenuation assembly 124. For example, the upper exhaust elbow 146 includes an upper portion that is longitudinally attached to the noise attenuation assembly 124 and is angled with respect to the lower exhaust elbow silencer 144. The angles of turn described herein may each be, for example, a 90 degree angle. The lower exhaust elbow silencer 144 and the upper exhaust elbow 146 may in combination form a U-shaped elbow structure.

Figure 5:
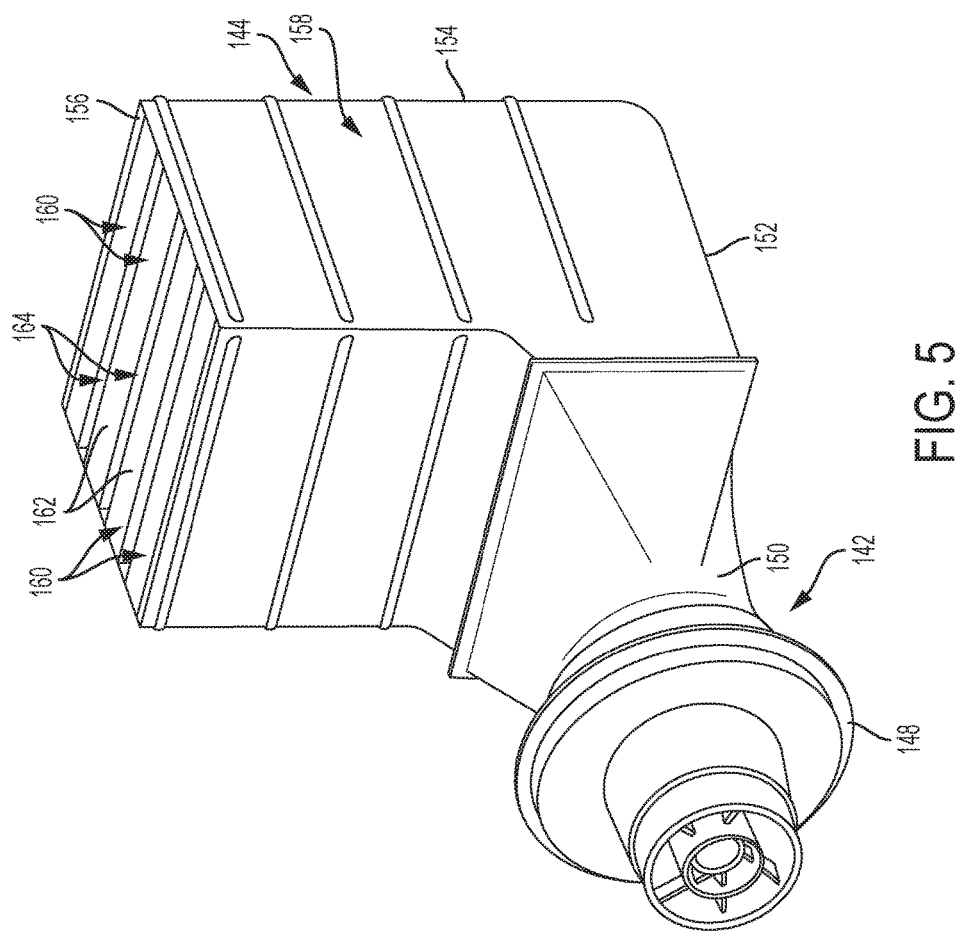
FIG. 5 illustrates an isometric view of an exhaust elbow of the mobile unit of FIG. 2 including a plurality of baffles, according to one or more embodiments of the present disclosure.
Figure 6:
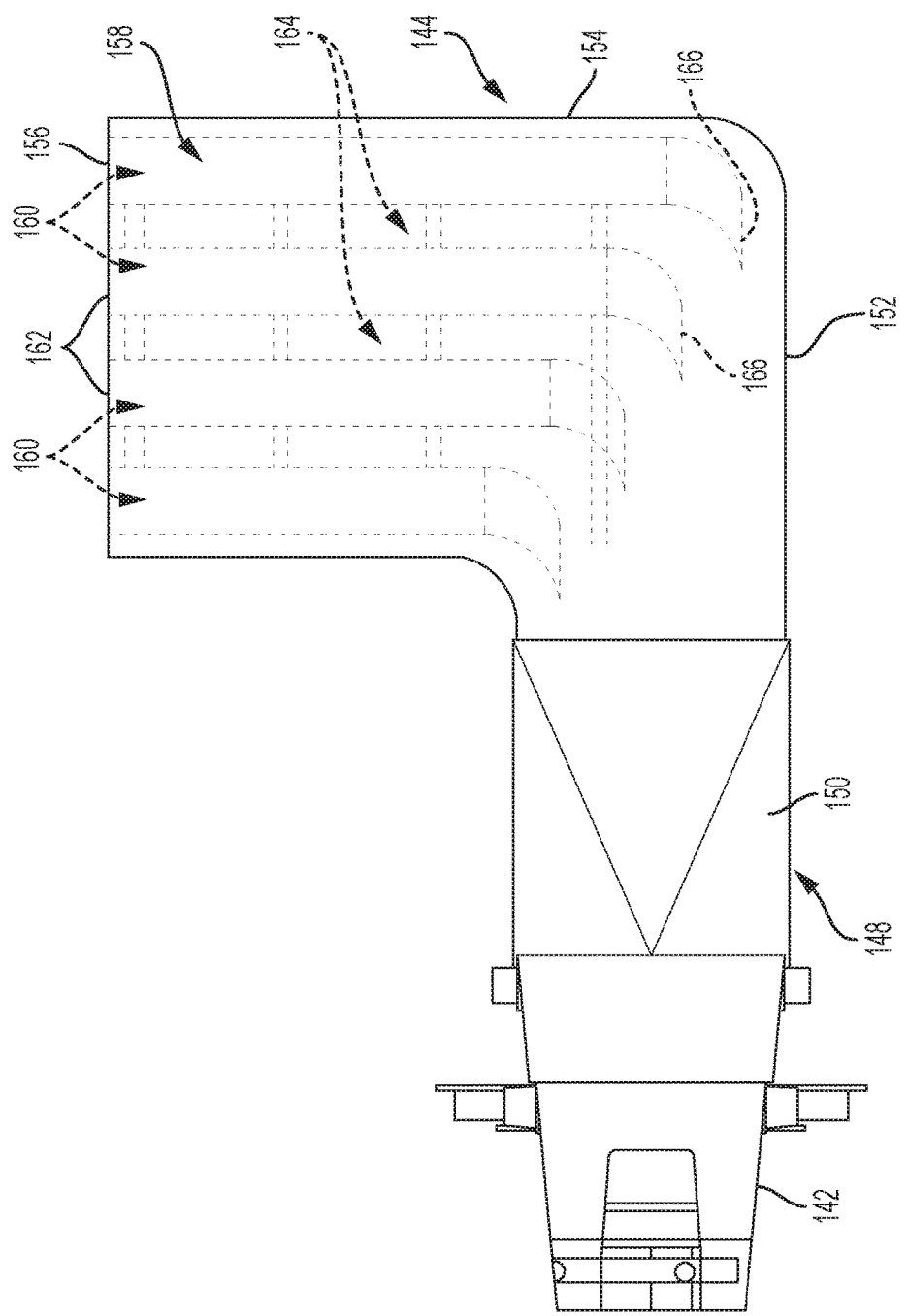
FIG. 6 illustrates a side elevation view of the exhaust elbow of FIG. 5.
Figure 7:
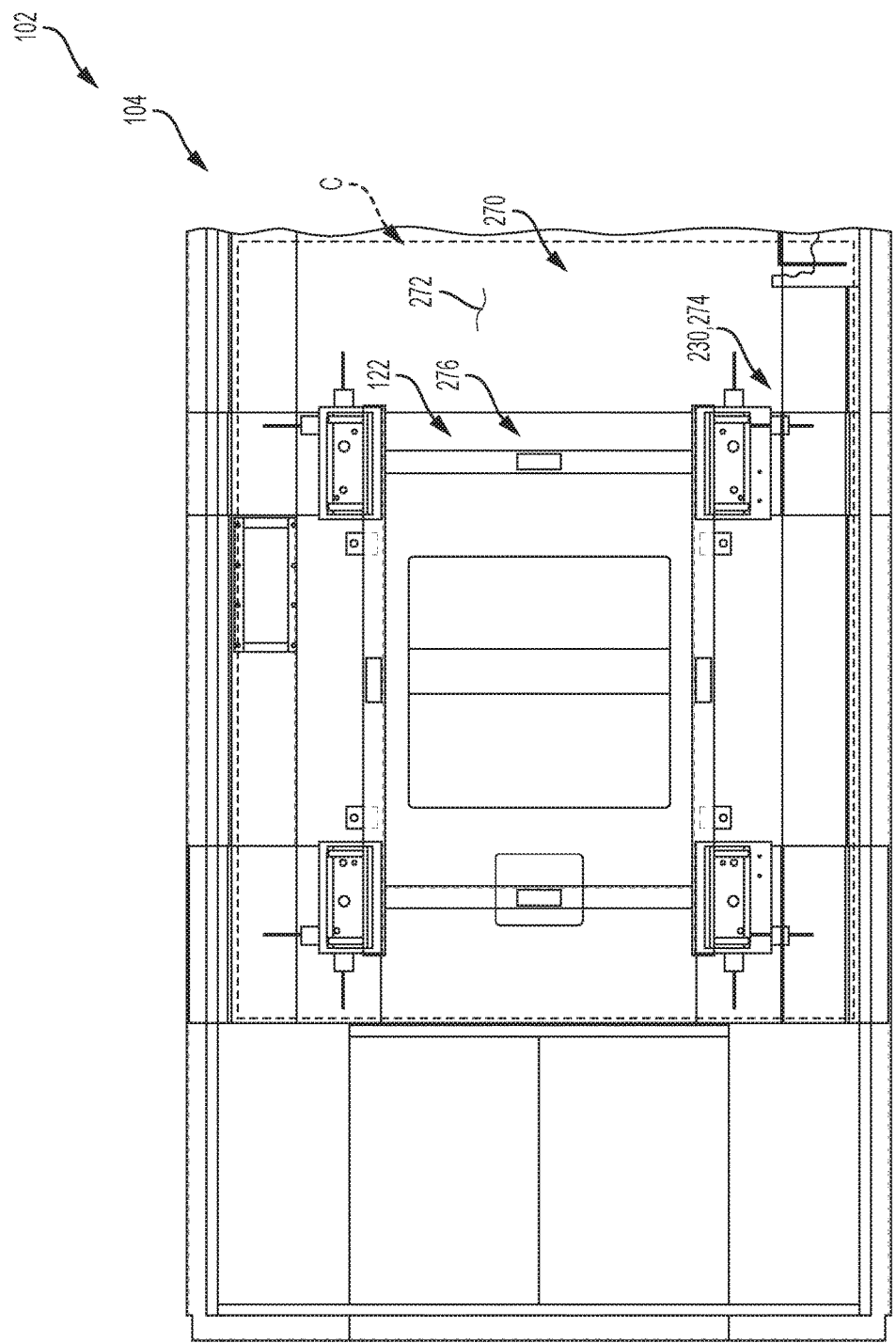
FIG. 7 schematically illustrates a top plan view of a fixture assembly including a fixture and a plurality of pads, the fixture assembly configured to arrange pads to support an electrical generator in a portion of the mobile unit of FIG. 2, according to one or more embodiments of the present disclosure.

With respect to the lower exhaust elbow silencer 144, a vertical space 158 is defined between the bottom end 152 and the top end 156 along a width defined by internal walls of the side portion 154. The plurality of baffles 160 may be disposed in the vertical space 158. The plurality of baffles 160 are configured to assist with noise attenuation through silencing of the exhaust gas. The plurality of baffles 160 may be distributed in a parallel arrangement in the vertical space 158 of the lower exhaust elbow silencer 144. The plurality of baffles 160 may have a thickness in a thickness range of from about six (6) inches to about eight (8) inches thick, respectively. The plurality of baffles 160 may be distributed in a vertical, parallel fashion in the vertical space 158 as illustrated in FIGS. 5-6.

The plurality of baffles 160 may have closed top ends 162 defining spacing 164 between a pair of baffles 160. The plurality of baffles 160 may include bottom ends 166 curving toward the direction of exhaust air intake in a pointed configuration. The bottom ends 166 may be closed. Each baffle 160 may be made of stainless steel, fiberglass, like materials, or a combination thereof to assist with absorption of noise energy.

The top end 156 of the lower exhaust elbow silencer 144 is in fluid communication with a bottom end of the upper exhaust elbow 146. The upper exhaust elbow 146 has a top end that is in fluid communication with a top-mounted, exhaust silencer unit 170 of the noise attenuation assembly 124. The exhaust gas flows through the exhaust silencer unit 170 for release to atmosphere through a turbine exhaust opening 172.

The exhaust silencer unit 170 may include a pair of coupled silencer components 174 that are in fluid communication with one another and mounted to the top end 118 of the trailer 104 of the mobile unit 102. Each silencer component 174 may extend with a length of twenty (20) feet and have a width of eight (8) feet and a height of four (4) feet, such that the exhaust silencer unit 170 with a pair of coupled silencer components 174 is forty (40) feet long, eight (8) feet wide, and four (4) feet tall.

Further, each silencer component 174 may include a central opening extending between ends of the silencer component 174. Each silencer component 174 may also include a first frame portion of material surrounding the central opening and made of, for example, a perforated stainless steel such as 304 stainless steel. Each silencer component 174 may include a second frame portion that may surround the first frame portion. The second frame portion may be made of an acoustical insulation material such as, for example, fiberglass or a like material suitable to absorb noise energy. For example, the acoustical insulation material may be made of FIBERGLAS TIW Types I and/or II Insulations as available from OWENS CORNING comprising a thermal insulating wool that is configured for use in applications up to 1000 degrees Fahrenheit. Each silencer component 174 may include a third frame portion that may surround the second frame portion and may be made of outer enclosure material such as steel or a like metal material. A plurality of metal studs may connect one or more of the frame portions to one another.

In embodiments, referring to FIGS. 2-4, a ventilation system 180 configured to provide electrical generator cooling may include a pair of ventilation air inlets 182 in fluid communication with a plenum 184, which is in fluid communication with an inlet of the electrical generator 122 comprises one or more fans such that a portion of air is drawn into the inlet of the electrical generator 122 and excess air is directed around the electrical generator 122. Atmospheric air is drawn in as ventilation air through an axial fan disposed in an opening defining each ventilation air inlet 182. Walls defining the opening to receive the axial fan may define a 2 foot by 2 foot space. An air filter 128 disposed in each opening of each ventilation air inlet 182 assists to clean the ventilation as well.

In embodiments, approximately ⅔ of the ventilation air is drawn through the plenum 184 and through the inlet of the electrical generator 122 to pass into the electrical generator 122. The other ⅓ of the ventilation air is drawn through the plenum 184 and is diverted around an outside wall of the electrical generator 122. As an example and not as a limitation, approximately 15,000 CFM of ventilation air may be drawn in through the ventilation air inlets 182 and drawn through the plenum 184 such that (1) about 10,000 CFM is drawn into the electrical generator 122 through the inlet for generator cooling and (2) about 5,000 CFM is diverted to surround the outside of the electrical generator 122.

Ventilation air from within the electrical generator 122 is released through an outlet and combines with the ventilation air surrounding the electrical generator 122 to travel through a base opening section 186 downstream toward the front end 112 of the trailer 104 and below a downstream end of the gas turbine 120 for capture in at air capture area 188 surrounding the diffuser 148. The air may then be released to atmosphere through a fan unit 190 disposed at the air capture area 188.

An air-oil heat exchanger 192 including an oil cooler system 194 may also be positioned in the air capture area 188. The oil cooler system 194 may include an oil cooler, a top ventilation air and oil cooler air outlet, and a pair of hoods defining cooler inlets, each hood respectively disposed on and extending outwardly from side panels 114 of the trailer 104 of the mobile unit 102 near the front end 112. The top ventilation air and oil cooler air outlet may be disposed on a portion of the top end 118 of the trailer 104 positioned above the air capture area 188. Oil from the gas turbine and oil from the reduction gear may be able to flow through paths fluidly coupled to the oil cooler system 194 for cooling. The fan unit 190 may be used for cooling both the electrical generator 122, a gearbox for the reduction gearing, the gas turbine 120, and the air-oil heat exchanger 192. The air-oil heat exchanger 192 may be part of a lubrication oil system as known to those skilled in the art for lubrication of the gas turbine 120, the gearbox, and the electrical generator 122.

The mobile power generation system 100 may include a compressor hot air supply system 200 for the anti-icing of filtration systems, such as for the anti-icing of the inlet of the gas turbine 120 along the bell-mouth duct 134. For example, icing on the air filters 128 of the filtration system may raise a pressure drop of the mobile power generation system 100 and diminish the power output to lead to gas turbine shut down. Thus, gas turbine efficiency and power output drops as the pressure drop increases due to icing on the air filters 128. Further, icing in the compressor may lead to damage to the internal components of the gas turbine 120. Raising an inlet air temperature may assist to diminish a risk of ice formation in the bell mouth duct at the inlet of the gas turbine 120. The compressor hot air supply system 200 may be configured to take hot air from the gas turbine compressor bleed. For example, hot air may be sent through pipes from the compressor of the gas turbine 120 to bleed into a reservoir and to, from the reservoir, be distributed through an anti-icing nozzle in an opposite direction of the air flow.

The mobile power generation system 102 includes wheels 108 of the mobile unit 102, which wheels 108 may include frame portions made out of a metal material, such as steel, aluminum, or the like. One or more support jacks 202 may be used to support and align the trailer 104 of the mobile unit 102 with respect to a ground 203.

Figure 11:
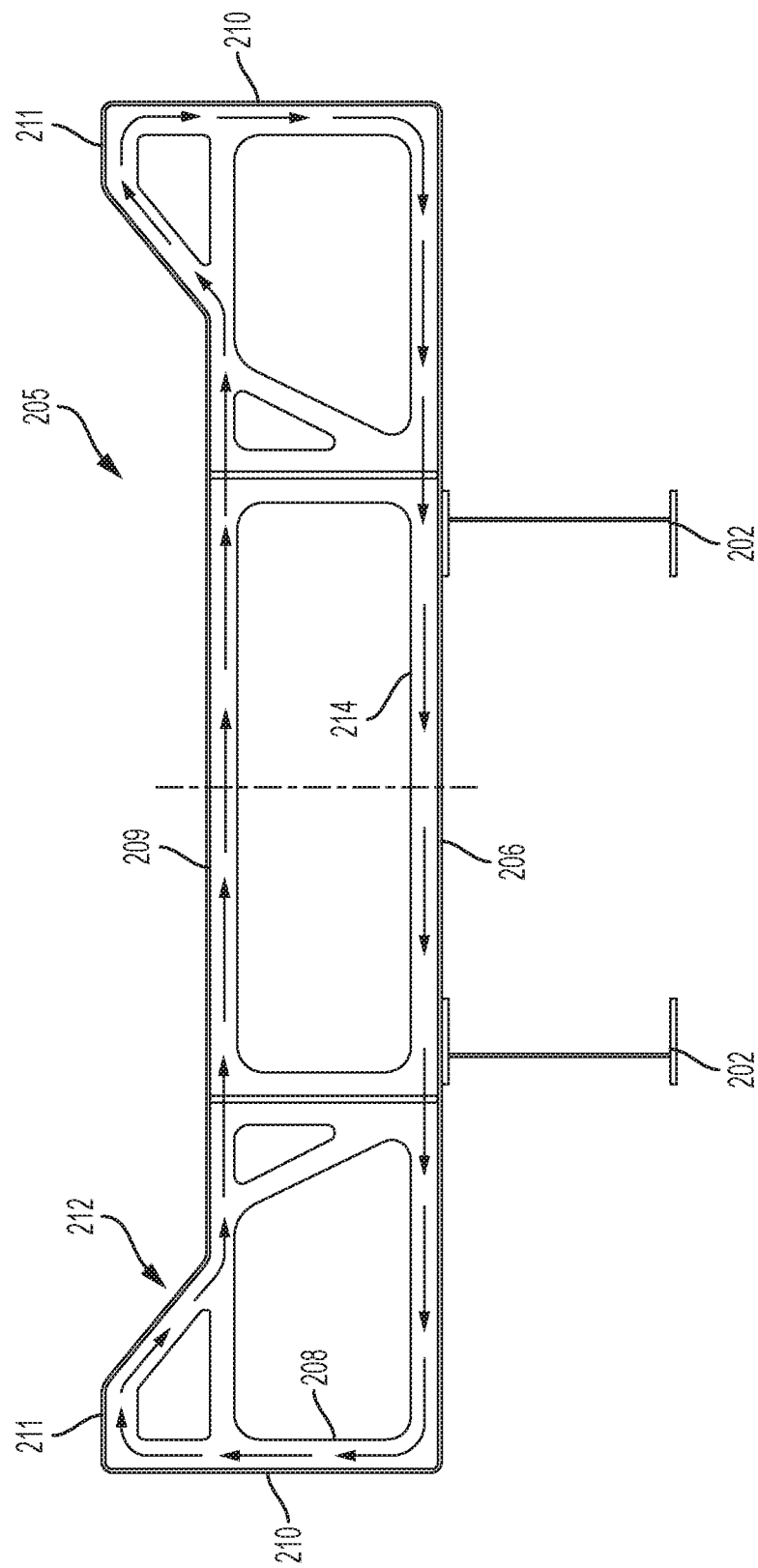
FIG. 11 schematically illustrates a closed cell base structure supported by one or more support jacks, according to one or more embodiments of the present disclosure.

Referring to FIGS. 1-3 and 11, one or more of the support jacks 202 may support a base 204 of the trailer 104 disposed along the bottom end 119 of the trailer 104. The base 204 may include a closed cell base structure 205 comprising a rigid surface configured to be mounted on top of the support jacks 202. When mounted on top of the support jacks 202, the closed cell base structure 205 is further configured to provide torsional stability to assist with distribution of uneven loads due to variance of forces from the support jacks 202. For example, FIG. 11 illustrates a shear flow within the closed cell base structure 205 that provides the closed cell base structure 205 with a sufficient amount of torsional stiffness required due to possible deflections at each trailer support point as supported by the support jacks 202.

The closed cell base structure 205 includes a U-shaped design with an exterior base 206 comprising the rigid surface configured to be mounted on the support jacks 202, intermediate exterior side walls 208 extending upwardly from side ends of the exterior base 206, and end exterior side walls 210 extending upwardly from outer ends of the exterior base 206. Top portions of the end exterior side walls 210 project inwardly to from thick end wall portions 211 each defining a wall thickness. A top opening 212 is defined by the thick end walls portions 211, top surfaces 209 of the intermediate exterior side walls 208, and interior base walls 214 extending therebetween to form the U-shaped design.

The thick end wall portions 211 of the end exterior side walls 210 are configured for a closed cell design (as indicated by the dashed lines in FIG. 11) to promote rigidity of the closed cell base structure such that eccentric load is distributed as shear forces across the closed cell base structure rather than as a punch load between a support jack 202 and the base 204. The closed cell base structure 205 thus is configured to provide a rigid design to promote stiffness and minimize bending with respect to the base 204 of the trailer 104 when supported on the one or more support jacks 202. In embodiments, the closed cell base structure 205 may be made of carbon and alloy steel, such as an ASTM A572-50 plate. The plate may include a wall thickness in a range of from about ¼ feet to about ⅜ feet, and the closed cell based structure 205 may be about 24 inches in height and 97 inches in length, though other suitable dimensions as understood to those skilled in the art are with the scope of this disclosure.

Figure 12:
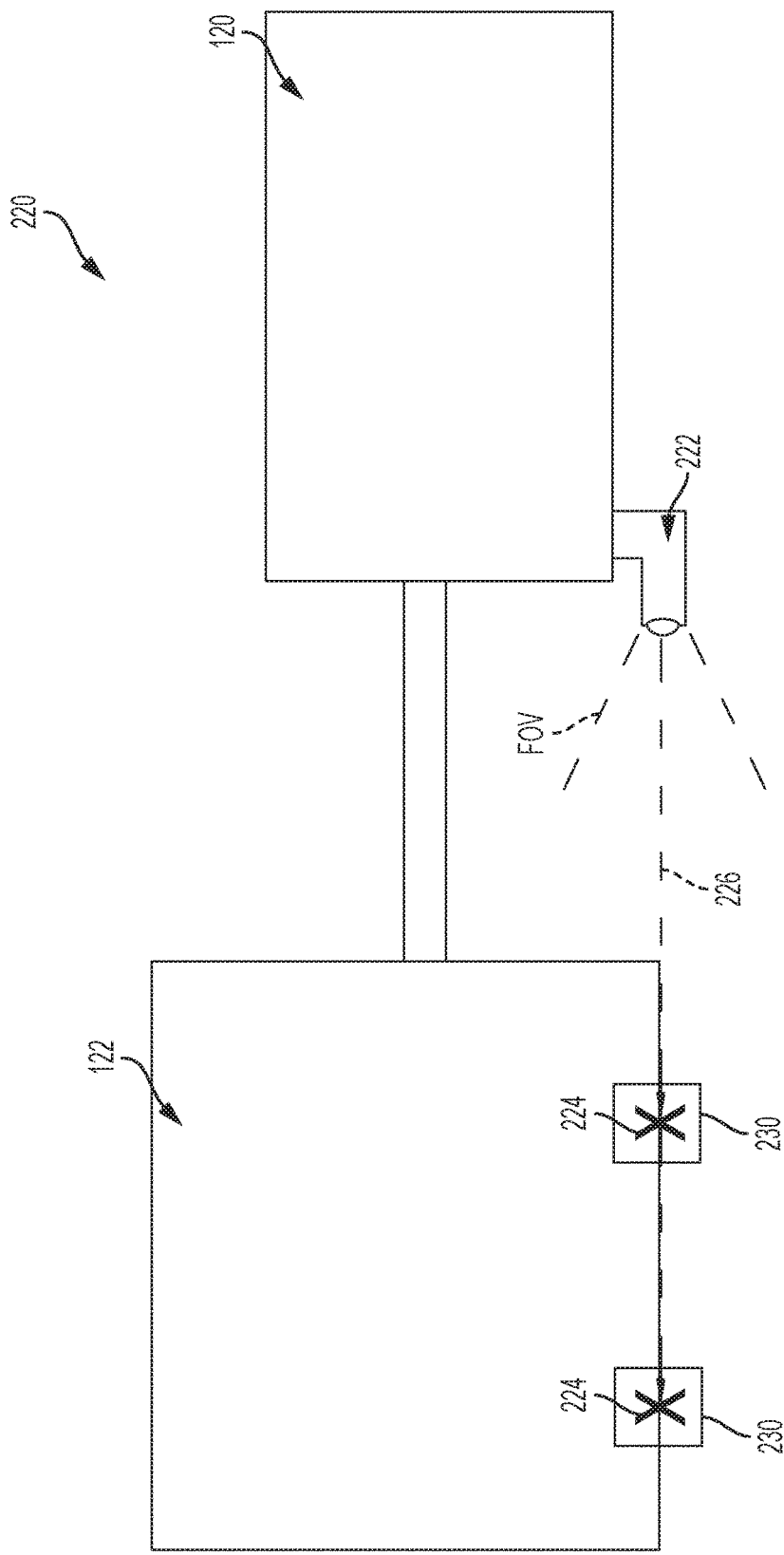
FIG. 12 schematically illustrates a side elevation view of an optical alignment system for online leveling of a rotor of the electrical generator with the gas turbine based on positioning of the one or more support jacks, according to one or more embodiments of the present disclosure.

Referring to FIG. 12, the mobile power generation system 100 may include an optical alignment system 220 for online leveling with respect to support jacks 202, trailer 104, and the ground 203. The optical alignment system 220 may be configured to send an alert upon a desired leveling of the trailer 104 with respect to ground by the support jacks 202 and/or to send an alert upon a leveling occurring outside of a desired range angle. The optical alignment system 220 is configured to align the gas turbine 120 with a rotor of the electrical generator 122 at a desired alignment, such as one shown in FIG. 1.

The optical alignment system 220 may include a camera kit including a camera 222. The camera kit may be a 8400 series camera kit available from the Brunson Instrument Company. The camera 222 may be mounted on the gas turbine 120 with a field of view (FOV) directed toward the electrical generator 122. One or more targets 224 for the camera 222 may be positioned on respective one or more generator pads 230, which are described in greater detail below, supporting the electrical generator 122.

Once a camera laser 226 transmitted from the camera 222, for example, is aligned with the one or more targets 224, a desired alignment is achieved. The optical alignment system 220 may be configured to send an alert or other notification once the desired alignment is achieved to indicate onsite leveling. The one or more support jacks 202 may be adjusted in height until the desired alignment is achieved. A digital video feed from the camera 222 may be sent back to a controller for viewing on a display of a computing device to provider a user with a visual depiction of the alignment or misalignment between the gas turbine 120 and the electrical generator 122 as well.

For example, and referring to FIG. 14, a system 300 for implementing a computer and software-based method to, for example, operate the optical alignment system 220 described herein may be implemented using a graphical user interface (GUI) provided such a display that is accessible at a user workstation 302 (e.g., a computer), an application server 304, a database 306, a computer-readable memory 308, a processor 310, and a network 312 connected through communication lines 314. The system 300 can include multiple workstations 302 and application servers 304 containing one or more applications that can be located at geographically diverse locations. In some embodiments, the system 300 is implemented using a wide area network (WAN), such as an intranet or the Internet. The workstation 302 may include digital systems and other devices permitting connection to and navigation of the network 312 through which components of the system are connected through wired or wireless communication lines 314 that indicate communication rather than physical connections between the various components.

The computer-readable memory 308 may be configured as computer readable medium that is non-transitory in that computer-readable memory 308 is not a transitory signal but is a storage medium that may store nonvolatile and volatile signals and, as such, may include random access memory (including SRAM, DRAM, and/or other types of random access memory), flash memory, registers, compact discs (CD), digital versatile discs (DVD), magnetic disks, and/or other types of storage components. Additionally, the computer-readable memory 308 may be configured to store, among other things, computer readable instructions, and any data necessary to aid the optical alignment system 220 described below.

As stated above, the processor 310 may include any processing component configured to receive and execute instructions (such as from the computer-readable memory 308). It is noted that the processor 310 as well as any additional controller hardware may be programmed to execute software instructions stored on the computer-readable memory 308. In some embodiments, the additional controller hardware may comprise logic gates to perform the software instructions as a hardware implementation. The processor 310 may be configured as, but not limited to, a general-purpose microcontroller, an application-specific integrated circuit, or a programmable logic controller.

The optical alignment system 220 may include one or more sensors that may be incorporated into larger systems, and may be able to communicate with external devices and components of such systems via input/output hardware (not shown). The input/output hardware may include any hardware and/or software for sending and receiving data to an external device. Exemplary input/output hardware includes, but is not limited to, universal serial bus (USB), FireWire, Thunderbolt, local area network (LAN) port, wireless fidelity (Wi-Fi) card, WiMax card, and/or other hardware for communicating with other networks and/or external devices.

Referring to FIGS. 1-3, the mobile unit 102 may include one or more auxiliary systems to support operating equipment such as fuel supply piping, the start system, the lubrication oil system 240 including a lubrication oil tank and drain, a fire detection and extinguishing system 242, and the power control room 244. The fire detection and extinguishing system 242 may include a light-weight FM-200 fire suppression system as available from DUPONT.

Referring to FIGS. 1-2, one or more pressurized bottles 246 including FM-200 may be stored on a single side of the trailer 104 in an interior area near an end of the electrical generator 122 positioned toward the power control room 244 and away and upstream from the gas turbine 120. For example, two pressurized bottles 246 may be stored behind the side panel 114 on a passenger side of the trailer 104 near the electrical generator 122 and may be accessible by a side access door 116A of the trailer 104 positioned to provide access to the fire detection and extinguishing system 242. Other fire suppression systems known to the those skilled in the art, such as those utilizing carbon dioxide, which is heavier that FM-200, are within the scope of this disclosure as well.

Figure 13:
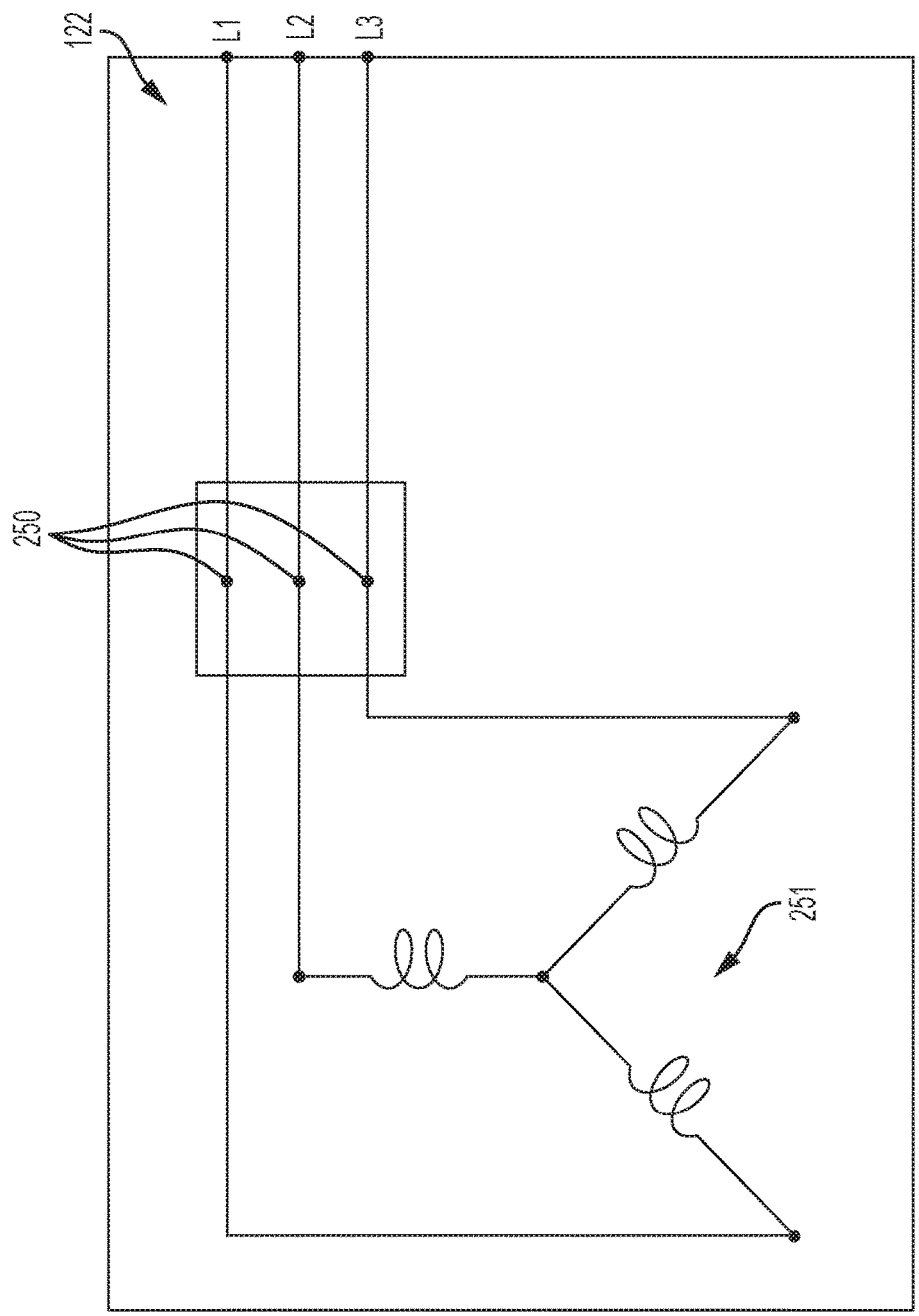
FIG. 13 schematically illustrates an electrical generator including one or more taps to provide power to generator parasitic loads such as the e or more auxiliary systems while also providing the main primary load output power through line ends, according to one or more embodiments of the present disclosure.

Referring to FIG. 13, electrical generator 122 may include one or more taps 250 to provide power to generator parasitic loads such as the one or more auxiliary systems while also providing the main primary load output power. For example, the electrical generator 122 may be configured to provide a 2600V-alternating current (AC) primary load (up to around 5,000 kW). The generator parasitic loads may require around 480V-AC (up to around 45 kW).

The electrical generator 122 may be configured to include a three-phrase voltage circuitry 251 including sets of three conductors and phase coiling such that a line-to-line voltage between ends of any of the three lines L1, L2, L3 generates the primary load (i.e., 2600V-AC). Further, at select points of each line, a tap 250 may be positioned to draw an auxiliary voltage of around 480V-AC from the line-to-line configuration. Thus, each tap 250 on each line may act as an auto-transformer and have a line-to-line voltage with another tap 250 on another line of the parasitic load (i.e., 480V-AC). Use of such taps 250 on the electrical generator 122 eliminates a need for an additional single-phase transformer as an additional, weighted component to drawn auxiliary power thus reducing weight, components, and potentially complexity and cost of the system. Each tap 250 may be, for example, a separate low voltage winding tab configured to draw auxiliary power from the electrical generator 122 based on the position of the tap 250 with respect to the three-phase conductors of the electrical generator 122.

In embodiments, and referring back to FIG. 1, the trailer 104 of the mobile unit 102 may include a series of side access doors 116 on each side panel 114 to access various components and systems in the trailer 104. For example, another side access door 116B may be positioned adjacent to the power control room 244 to permit access to the power control room 244.

The power control room 244 may include, for example, a switchgear center, a motor control center, a unit control panel, a fire system panel communicatively coupled to the fire detection and extinguishing system 242, an instrument air supply compressor, one or more electronic storage devices such as a battery and/or a charger, and one or more electrical connectors to supply power. One or more blowout panels B may be positioned along a top portion of the rear end 110 of the trailer 104. The blowout panels B may be configured to monitor pressure within the power control room 244 to open upon a pressure threshold being reached such that pressure is released from the power control room 244 to atmosphere. As a non-limiting example, the pressure threshold may be in a range of from about 1.5 to 3 times atmospheric pressure. The blowout panels B are configured to mitigate damage from an electrical failure of gear in the switchgear center. For example, the one or more blowout panels B may include a pair of magnetic hinged doors disposed at an aft wall of the power control room 144 and configured to relieve pressure in the power control room 244 as an arc flash protection mechanism, which arc flash event causes rapid heating of gear in the power control room 244.

The mobile power generation system 100 may further include an integrated heat, ventilation, and air conditioning (HVAC) system 260 that may be positioned at the switchgear center at the rear end 110 of the trailer 104. In embodiments, the blowout panel(s) B may be positioned above the HVAC system 260. The HVAC system 260 may include a plurality of duct work and plenum systems throughout the mobile power generation system 100 to supply and return air through a plurality of ducts and plenums, which may be made of metal and/or fiberglass, for example, for either heating or cooling of the mobile power generation system 100 in addition to the other sub-systems described herein. For example, the HVAC system 260 may aid to maintain one or more rooms at a desired room temperature, such as the power control room 244 including switchgear at the rear end 110 of the trailer 104, which is described in greater detail below. In embodiments, the HVAC system 260 may keep the temperature in the power control room 244 within a range of from about 50 degrees Fahrenheit to about 150 degrees Fahrenheit.

In embodiments, and referring to FIGS. 7-10B, the electrical generator 122 may be seated on a generator pad assembly 270 disposed on an internal base 272 (i.e., floor) of the trailer 104 of the mobile unit 102. The generator pad assembly 270 may include a plurality of generator pads 230 fixed to the internal base 272, a respective plurality of sole plates 274 positioned above the generator pads 230 at a spacing, and a supportive material C positioned around the generator pads 230 and the sole plates 274 to fix them in an aligned position. For example, the supportive material C may be a cured porous resinous material for chocking industrial machinery or equipment such as a CHOCKFAST ORANGE (PR-610TCF) compound as available by Illinois Tool Works (ITW) Engineered Polymers North America of Montgomeryville, Pa. A fixture 276 may be used to position the generator pad assembly 270 in the aligned positioned.

Figure 8A:
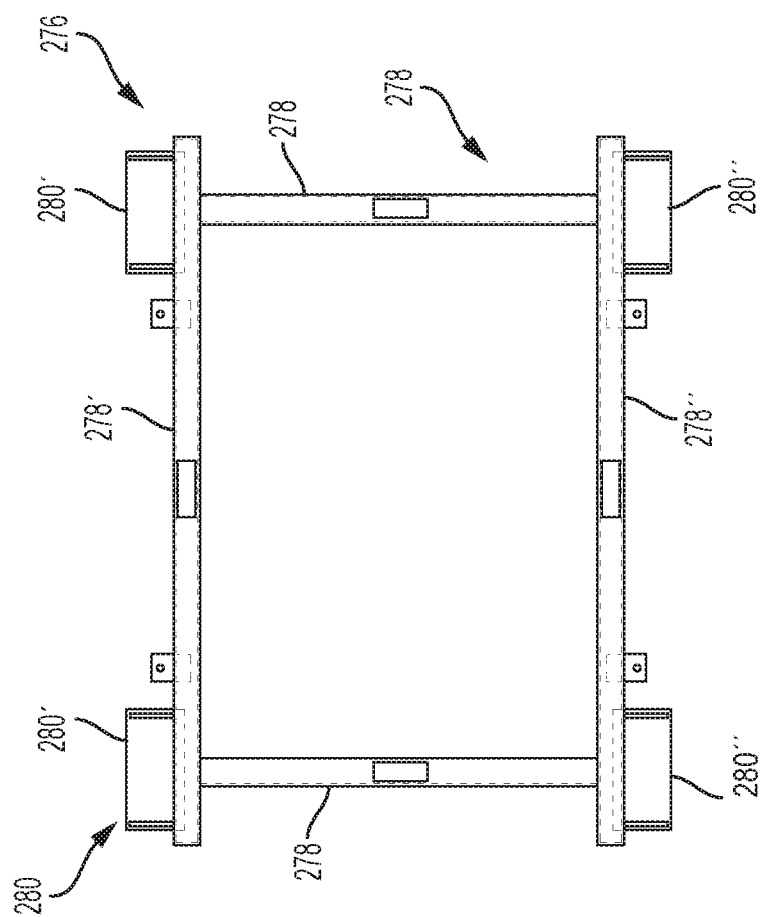
FIG. 8A schematically illustrates a top plan view of the fixture of FIG. 7.
Figure 9A:
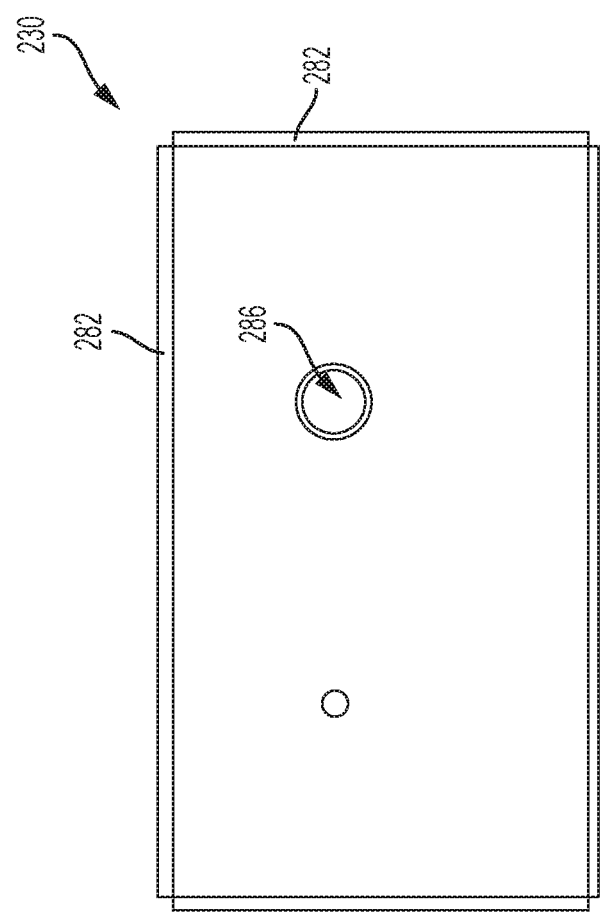
FIG. 9A schematically illustrates a top plan view of an example generator pad of the fixture assembly of FIG. 7.
Figure 9B:
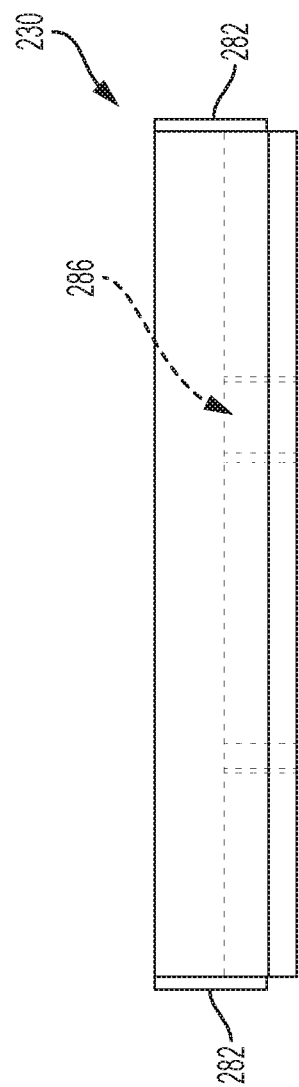
FIG. 9B schematically illustrates a side elevation view of the example generator pad of FIG. 9A.
Figure 10A:
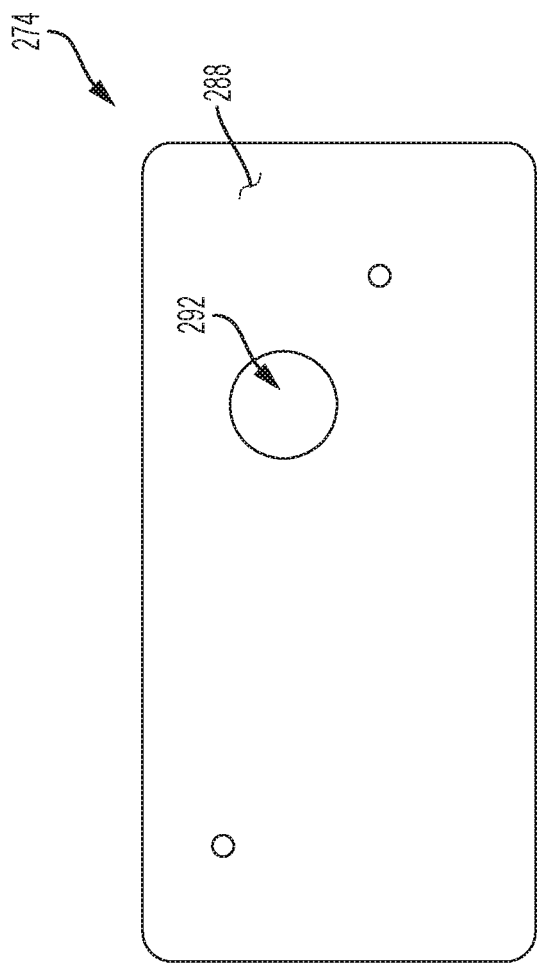
FIG. 10A schematically illustrates a top plan view of an example sole plate of the fixture assembly of FIG. 7.

A method of assembling the generator pad assembly 270 may include providing the fixture 276 to use to fix the generator pad assembly 270 to the internal base 272 of the trailer 104 of the mobile unit 102. Referring to FIG. 8A, the fixture 276 may include a plurality of base beams 278 aligned and configured to form a desired alignment shape. For example, the fixture may include four base beams 278 forming a rectangle.

A plurality of mounting pads 280 may extend from at least two opposing base beams 278. In an embodiment, a first pair of mounting pads 280' are positioned to extend from near ends of a first base beam 278', and a second positioned pair of mounting pads 280" are positioned to extend from near ends of a second base beam 278" that is placed opposite and in parallel to the first base beam 278'.

The plurality of mounting pads 280 are configured and sized and shaped to be seated within and atop a respective plurality of generator pads 230 (FIGS. 9A-9B) when the fixture 276 is used to position the plurality of generator pads 230 to the internal base 272. The plurality of mounting pads 280 are further configured and sized and shaped to be seated atop a respective plurality of sole plates 274 (FIGS. 10A-10B) when the fixture 276 is used to position then plurality of sole plates 274 to the internal base 272.

The plurality of generator pads 230 (FIGS. 9A-9B) are mounted onto the plurality of mounting pads 280 of the fixture 276 (FIGS. 8A-8B). An upper facing surface of the fixture 276 faces upwardly, while a lower facing surface of the fixture 276 faces toward the generator pads 230 and the internal base 272. The plurality of generator pads 230 are respectively mounted onto a lower facing surface 290 of the plurality of mounting pads 280 (FIG. 8B) of the fixture 276 such that a surrounding upwardly positioned dam portion 282 of each generator pad 230 surrounds and extends upwardly past ends of each mounting pad 280. Each mounting pad 280 is fixed to each generator pad 230 through connecting mechanisms such as bolts through one or more apertures 284 in each mounting pad 280 that may join with one or more apertures 286 in a respective generator pad 230.

A center of a section of the internal base 272 may be established such as by, for example, use of a string line for alignment and use of end weight markers to mark designed alignment points along the string line. One or more datum reference points may be established between the fixture and the internal base to set the fixture in a desired alignment position such that, for example, a center of the fixture 276 aligns with the center of the section of the internal base 272 in which to seat the electrical generator 122. The plurality of generator pads 230 may be seated against the internal base 272 in the desired alignment position and then welded to the internal base 272. The fixture 276 may be removed from the plurality of generator pads 230 prior to or after the plurality of generator pads 230 are welded to the internal base 272 of the trailer 104 of the mobile unit 102 in the desired alignment position.

Once the plurality of generator pads 230 are established in an x-position and y-position with respect to the internal base 272, and the fixture 276 removed, the fixture 276 may be attached to the plurality of sole plates 274 (FIGS. 10-10B) that will need to be established in a floating z-position with respect to respective generator pads 230. For example, the plurality of mounting pads 280 of the fixture 276 are configured to be seated against and attached to the plurality of sole plates 274. The lower facing surface 290 of each mounting pad 280 (FIG. 8B) will attach to an upper facing portion 288 of each sole plate 274, and at least one bolt may be run through apertures 292 of each sole plate 274 and respective apertures 284 of each mounting pad 280 to attach the respective mounting pads 280 and sole plates 274 together.

A bolt may be positioned between each sole plate 274 and each respective generator pad 230 above which each sole plate 274 is positioned at a desired z-position elevation. For example, each sole plate 274 may be vertically spaced from a respective generator pad 230 at a distance that may range from about ¼ inches to about ½ inches.

Once the plurality of generator pads 230, the plurality of sole plates 274, and the fixture 276 is in place in the desired three-dimensional positions, a chocking compound may be poured around the generator pad assembly 270 to approximately, for example, a quarter of an inch above a lower-facing surface 294 of each sole plate 274. The chocking compound may cured for a period of time, which may range from about 12 hours to a few days. After the chocking compound is cured for the period of time, the fixture 276 may be removed from the sole plates 274 such that the generator pad assembly 270 is in a set position configured to receive the electrical generator 122 in a seated position. Further, any remaining bolts and studs that remained in position during the curing may be removed from the assembly as well.

While certain representative embodiments and details have been shown for purposes of illustrating the disclosure, it will be apparent to those skilled in the art that various changes may be made without departing from the scope of the disclosure, which is defined in the appended claims.

What is claimed is:

1. A mobile power generation system comprising:
   a trailer including a rear end, a front end, a bottom end, and a top end defining therebetween an interior space that comprises an internal base;
   a gas turbine housed inside the trailer in the interior space;
   an electrical generator coupled to the gas turbine to generate electricity and housed inside the trailer in the interior space;
   a generator pad assembly including a plurality of generator pads fixed to the internal base, a respective plurality of sole plates positioned above the plurality of generator pads at a spacing, and a supportive material positioned around the plurality of generator pads and the respective plurality of sole plates to fix them in an aligned position; and
   a fixture configured to fix the generator pad assembly to the internal base at the aligned position.

2. The mobile power generation system of claim 1, wherein the supportive material comprises a cured porous resinous material for chocking.

3. The mobile power generation system of claim 1, wherein the supportive material positioned around the plurality of generator pads and the respective plurality of sole plates is disposed between the internal base and at about ¼ inches above a lower-facing surface of each sole plate.

4. The mobile power generation system of claim 1, wherein the plurality of generator pads comprise four generator pads.

5. The mobile power generation system of claim 1, wherein the spacing is disposed along a z-axis at a range of from about ¼ inches to about ½ inches.

6. The mobile power generation system of claim 1, wherein the fixture comprises a plurality of base beams aligned and configured to form a desired alignment shape.

7. The mobile power generation system of claim 6, wherein the desired alignment shape formed by the plurality of base beams is a rectangle.

8. The mobile power generation system of claim 6, wherein the fixture comprises a plurality of mounting pads.

9. The mobile power generation system of claim 8, wherein the plurality of mounting pads extend from at least two opposing base beams of the plurality of base beams.

10. The mobile power generation system of claim 8, wherein a first pair of mounting pads are positioned to extend from near ends of a first base beam, and a second pair of mounting pads are positioned to extend from near ends of a second base beam placed opposite to and in parallel with the first base beam.

11. The mobile power generation system of claim 8, wherein the plurality of mounting pads are configured to be sized and shaped to be seated within and atop the plurality of generator pads when the fixture is used to position the plurality of generator pads to the internal base.

12. The mobile power generation system of claim 8, wherein the plurality of mounting pads are configured to be sized and shaped to be seated within and atop the respective plurality of sole plates when the fixture is used to position the respective plurality of sole plate above the plurality of generator pads when disposed on the internal base.

13. A method for using a fixture to position a generator pad assembly in a mobile power generation system, the method comprising:
    seating a plurality of mounting pads of the fixture atop a plurality of generator pads;
    disposing the plurality of generator pads on one or more datum reference points on an internal base of the mobile power generation system in a desired alignment position comprising an x-position and y-position with respect to the internal base;
    removing the fixture from the plurality of generator pads;
    seating the plurality of mounting pads of the fixture atop a respective plurality of sole plates;
    establishing the respective plurality of sole plates attached to the fixture in a floating z-position with respect to the plurality of generator pads to form the generator pad assembly;
    pouring a chocking compound around the generator pad assembly;
    curing the chocking compound for a period of time; and
    removing the fixture from the generator pad assembly such that the generator pad assembly with the chocking compound after curing is in a set position configured to receive an electrical generator in a seated position.

14. The method of claim 13, wherein the one or more datum reference points are established between the fixture and the internal base such that a center of the fixture aligns with a center of a section of the internal base on which to seat the electrical generator.

15. The method of claim 14, wherein the center of the section of the internal base is established by use of a string line for alignment and by use of end weight markers to mark one or more desired alignment points along the string line.

16. The method of claim 13, further comprising welding the plurality of generator pads to the internal base in the desired alignment position before or after removing the fixture.

17. The method of claim 13, wherein establishing the respective plurality of sole plates attached to the fixture in a floating z-position with respect to the plurality of generator pads comprises positioning a bolt between each generator pad and each respective sole plate at the floating z-position.

18. The method of claim 13, wherein the period of time for curing is greater than 12 hours.

19. The method of claim 13, further comprising removing any remaining bolts or studs from the generator pad assembly after the curing.

* * * * *